United States Patent [19]

Ito

[11] Patent Number: 5,317,123
[45] Date of Patent: May 31, 1994

[54] CONTROLLER FOR A STUD WELDING MACHINE

[75] Inventor: Hiroshi Ito, Aichi, Japan

[73] Assignee: Emhart Inc., Newark, Del.

[21] Appl. No.: 91,837

[22] Filed: Jul. 13, 1993

[30] Foreign Application Priority Data

Jul. 17, 1992 [JP] Japan ................. 4-50287[U]

[51] Int. Cl.$^5$ ............................................. B23K 9/20
[52] U.S. Cl. ......................................................... 219/98
[58] Field of Search ................................. 219/98, 99

[56] References Cited

U.S. PATENT DOCUMENTS

| | | | |
|---|---|---|---|
| 4,297,560 | 10/1981 | Netzsch | 219/98 |
| 4,988,842 | 1/1991 | Van Allen | 219/98 |
| 5,030,815 | 7/1991 | Glorioso | 219/98 |

*Primary Examiner*—Clifford C. Shaw
*Attorney, Agent, or Firm*—Edward D. Murphy

[57] ABSTRACT

The invention keeps welding time constant by appropriately setting the time of stud descent determined by the de-energization of lift means so as to obtain stable quality of welding. A stud welding machine has a welding gun having a collet to hold a stud and a lift coil to lift the stud from a base material. A control device is connected to a power source and the welding gun and functions to supply power from the power source to the welding gun to produce a pilot arc and later a main arc. The control device energizes the lift coil to lift the stud to a predetermined height to produce the pilot arc and the main arc, and it de-energizes the lift coil so as to bring the stud into press-contact with the base material to make the weld. The control device has a voltage detector to detect that the stud is in press-contact with the base material and to stop the power supply from the power source to the welding gun upon receipt of a press-contact signal from the detector. The control device is provided with a counter to measure descent time from the de-energization of the lift coil to the press-contact of the stud with the base material, and a calculator to calculate an average value of descent times measured N times. A sequence controller adjusts the timing of de-energization of the lift coil by using the calculated average value.

1 Claim, 2 Drawing Sheets

CONTROLLER FOR A STUD WELDING MACHINE

FIELD OF THE INVENTION

The present invention relates to a stud welding machine. More in particular, it relates to means for controlling the energization and de-energization of lift means for a collet of a welding gun in the machine to adjust the timing of bringing a stud held in the collet into press-contact with the base material to weld the stud to the base material.

PRIOR ART

There is a well-known stud welding machine comprising a welding gun having a collet to hold a stud at the end thereof and lift means to lift the stud held by the collet from a base material. The machine includes a power source connected to the welding gun to supply predetermined power across the stud and the base material, and a control device which is connected to the power source and the welding gun. This machine includes controls to supply power from the power source to the welding gun to produce a pilot arc and subsequently a main arc across the stud and the base material. It also includes controls to energize the lift means of the welding gun to lift the stud to a predetermined height from the base material to produce the pilot arc and the subsequent main arc and to later de-energize the lift means after a predetermined time in order to press the stud onto the base material to thus weld the stud to the base material. This stud welding machine is frequently used to weld studs to a vehicle body or the like.

In the above-described stud welding machine, the timing of bringing the stud into press-contact with the base material and the timing of supplying an electric current to the welding machine sometimes fail to be controlled satisfactorily. The capacitor discharge type and the transformer rectifier type of power sources are known. When a capacitor discharge type power source is used, the amount and the time of electric power supplied to the welding gun depend on the capacity and the impedance of the capacitor, which means it is not possible to synchronize the timing of bringing the stud into press-contact and the waveforms of the welding current. Power to be supplied by a transformer rectifier power source also depends on the capacity and the impedance of the transformer and the phase control of the thyristor for rectification. Again, synchronized control of the timing of press-contact of the stud and the waveforms of the welding current is impossible. As is known in a stud welding machine using a capacitor discharge type power source, it is desirable to bring the stud into press-contact with the base material on the descending slope of the last wave of welding current and in a portion thereof within ⅓ or so of the slope from the top. In a stud welding machine using a transformer rectifier type power source, press-contact is preferred to coincide with the descending slope of the last wave of welding current and in a portion within ⅓ or so of the slope from the top.

The inventor herein has previously proposed a stud welding machine having a control device that controls the welding current supplied to the welding gun so as to coincide with the timing of press-contact of the stud. This control device for a stud welding machine is provided with detection means which detects the voltage across the stud and the base material and outputs a signal indicating that the stud is in press-contact with the base material. Since the supply from the power source to the welding gun is stopped when the control device receives the press-contact signal from the detection means, thereby cutting off the electric current after confirmation of the press-contact of the stud with the base material, differences in timing between press-contact and supply of electric current is eliminated.

Nevertheless, even a stud welding machine equipped with this control device is not completely free from the problem of unstable welding quality resulting from fluctuation of welding time since the welding time also varies according to changes in mechanical resistance in the ascent or descent of the collet caused by energizing or de-energizing the lift means and differences in the height of lift adjusted by the lift means.

SUMMARY AND ADVANTAGES OF THE INVENTION

Accordingly, the present invention aims to provide a stud welding machine that is capable of keeping the welding time constant by approximately adjusting the time of descent of the stud caused by de-energization of the lift means so as to stabilize the welding quality.

In order to achieve the above-stated object, according to the present invention, there is provided a stud welding machine comprising a welding gun having a collet to hold a stud at the end thereof and lift means to lift the stud held by the collet from a base material. The stud welding machine includes a power source connected to the welding gun to supply predetermined power across the stud and the base material. The stud welding machine includes a control device which is connected to the power source and the welding gun to control the power supplied from the power source to the welding gun to produce a pilot arc and to subsequently produce a main arc across the stud and the base material. The control device includes means to energize the lift means of the welding gun to lift the stud to a predetermined height from the base material to produce the pilot arc and the main arc, and to de-energize the lift means after a predetermined time in order to press the stud onto the base material to make the weld. The control device is provided with detection means which detects the voltage across the stud and the base material and outputs a signal indicating that the stud is in press-contact with the base material. The control device stops the supply of power from the power source to the welding gun after receiving the press-contact signal from the detection means. The control device is provided with means to measure the descent time from the de-energization of the lift means to contact of the stud with the base material, means to calculate an average value of such times measured N times, and means to adjust the timing of de-energization lift means by using the average value.

BRIEF DESCRIPTION OF THE DRAWING

The present invention is described further by way of a preferred embodiment which is shown in the accompanying drawings, wherein.

DESCRIPTION OF THE PREFERRED EMBODIMENT

Figure 1:
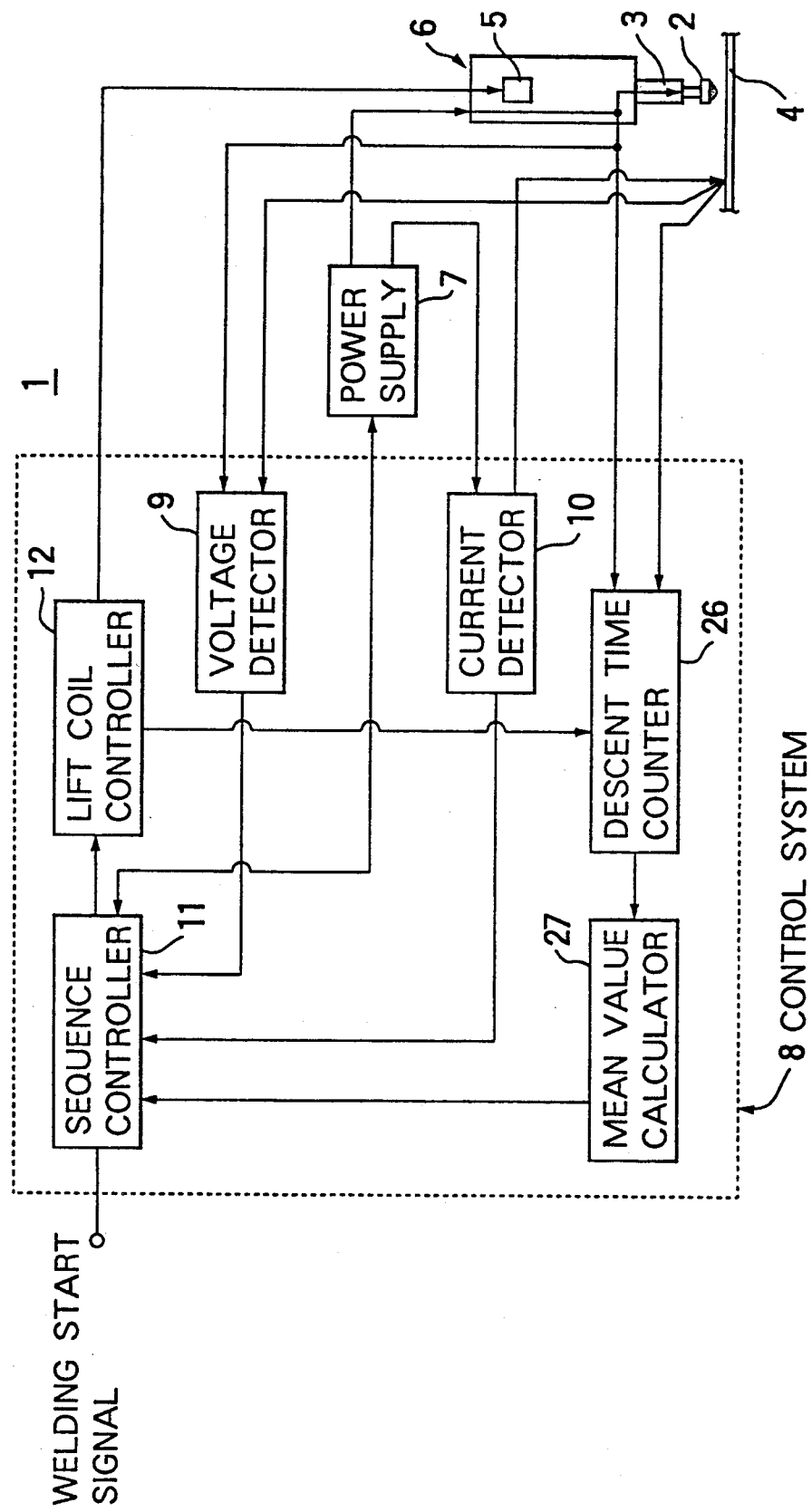
FIG. 1 is a circuit diagram of a stud welding machine according to the present invention.

A stud welding machine 1 of the present invention has a welding gun 6 having a collet 3 to hold a stud 2 at the end thereof. A lift coil 5 is provided to lift the stud 2 held by the collet 3. A power source 7 connected to the welding gun supplies predetermined amounts of power across the stud 2 and a base material 4 to which stud 2 is to be welded. A control device 8 is connected to the power source 7 and the welding gun 6. The control device 8 controls the electric power supplied from the power source 7 to the welding gun to produce a pilot arc and a subsequent main arc across the stud 2 and the base material 4. At the same time, it controls the lift coil 5 of the welding gun 6 to lift the stud 2 to a predetermined height from the base material 4 to produce the pilot arc and the subsequent main arc. The lift coil 5 can be de-energized to press the stud 2 onto the base material 4 after a predetermined time to make the weld. The stud welding machine 1 is of the drawn arc type which lifts a stud simultaneously with applying a voltage to the stud brought in contact with a base material, producing an arc discharge on the surfaces to be welded between the base material and the stud, and brings the stud into press-contact with the base material at a time when the temperature is suitable for welding.

The control device 8 is provided with a voltage detector 9 which detects the voltage across the stud 2 and the base material 4 and outputs a signal indicating that the stud is in press-contact with the base material. Device 8 also includes a current detector 10 which detects the welding current supplied from the power source 7 to the welding gun 6. Detection signals output from these detectors 9 and 10 are sent to a sequence controller 11 to control a series of actions necessary for the drawn arc type of stud welding machine. The power source 7 is a chopper type high frequency source and is controlled by the PWM system. Accordingly, the power source 7 is controlled by the sequence controller 11 so that it's electric current is suitable for producing a pilot arc and a subsequent main arc while always keeping the voltage constant. In other words, outputs from the current detector 10 are input in the sequence controller 11. Based on these inputs, controller 11 limits the current during the pilot arc and allows a larger current to flow during the main arc. Outputs from the voltage detector 9 indicate a period in which the stud 2 is separated from the base material 4 and a period in which the stud 2 is in press-contact with the base material 4. These outputs are also input into the sequence controller 11.

Control outputs from the sequence controller 11 are input to a lift coil controller 12 to energize and de-energize the lift coil 5. The lift coil controller 12 energizes the lift coil 5 to lift the collet 3 of the welding gun 6 against the force of a spring contained therein. Due to this lift, the stud 2 is raised to a predetermined height from the base material 4 while a pilot arc and subsequently a main arc are produced. After a predetermined time passes and the end of the stud and a part of the base material are molten, the lift coil controller de-energizes the lift coil 5 and this de-energization allows the spring force of the integral spring to lower the collet 3.

Figure 2:
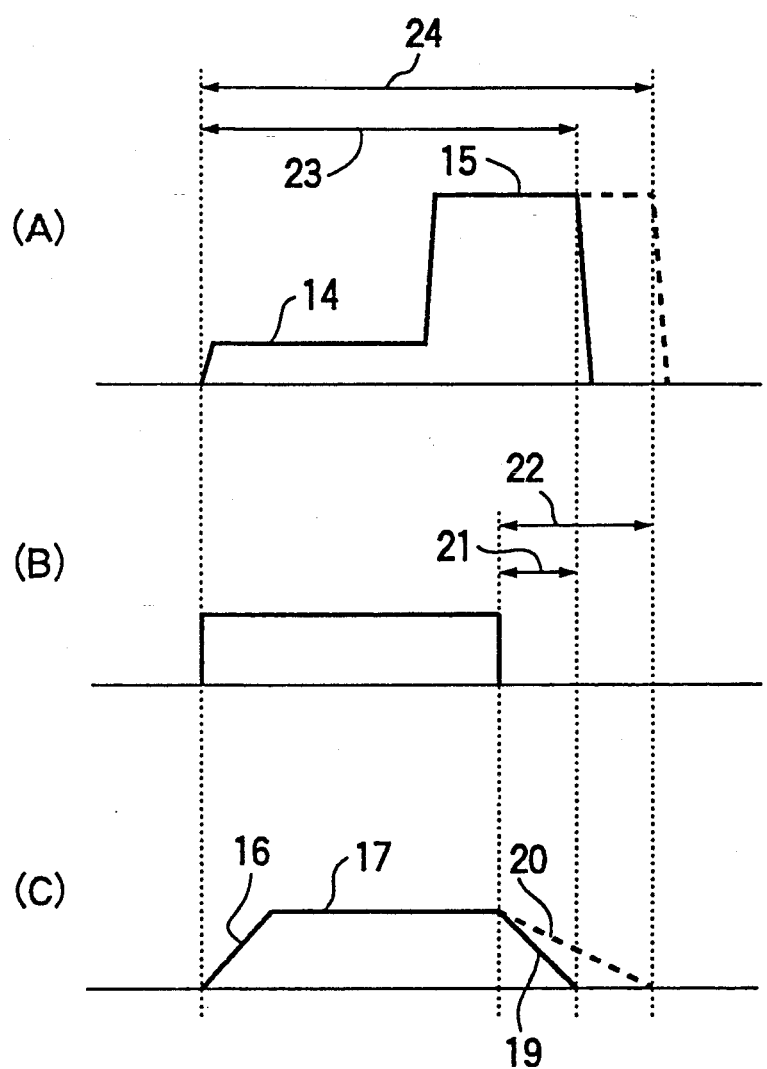
FIG. 2 is an explanatory drawing showing the relationship among welding current, lift coil energization and lift movement.

In the stud welding machine 1 of the above-described structure, a pilot arc current 14 and a main arc current 15 of the relative sizes shown by the waveform (A) of FIG. 2 are supplied one by one from the power source 7 to the stud 2 and the base material 4. Both are constant-voltage currents. As shown by the waveform (B) of FIG. 2, the lift coil controller 12 energizes the lift coil 5 from the beginning of the pilot arc until the temperature of the stud and the base material melted by the main arc reaches a predetermined value. In the actual lift movement, however, the stud 2 is raised from the base material 4 gradually to a predetermined height as shown by a slope 16 of the waveform (C) of FIG. 2 due to resistance acting on the collet 3 and other reasons, and is retained for a predetermined period of time at the predetermined height to which it has been lifted as shown by flat portion 17. Once the temperature of the stud and the base melted by the main arc reaches the predetermined . the lift coil 5 is de-energized and the stud 2 descends gradually as shown by slope 19 due to resistance acting on the collet 3 and other reasons. When the stud 2 is brought into press-contact with the base material 4 during the above-mentioned descent, welding is accomplished satisfactorily since the portions of the stud 2 and the base material 4 to be welded are melted properly. Upon press-contact of the stud 2 with the base material 4, the voltage across the two members lowers to zero, in response to which the voltage detector 9 outputs a press-contact signal. Receiving the press-contact signal from the voltage detector 9, the sequence controller 11 sends a control signal to the power source 7 to stop the power supply. Thus, the electric current is cut off after the press-contact of the stud with the base material is confirmed, whereby differences in timing between the press-contact and the supply of power is fully prevented.

Nonetheless, the descent of the collet caused by de-energization of the lift coil 5, or the resultant descent of the stud 2 to the base material 4 sometimes fails to correspond to the slope 19, as shown by a broken line in FIG. 2 (C), because of changes with the passage of time of the sliding resistance of the portion of the collet moved by the lift means, variance among adjusted distances of the welding gun 6, and the like. This increases the time of descent 21 to a time of descent 22 in FIG. 2 (B) to prolong welding time 23 to welding time 24 in FIG. 2 (A), giving rise to the possibility of low quality welding.

To deal with this, according to the present invention, the control device 8 is provided with a descent time counter 26 to measure descent time from the de-energization of the lift coil 5 to contact of the stud 2 with the base material 4. A lift coil energization signal is input to the descent time counter 26 from the lift coil controller 12, and other inputs are connected to the stud 2 and the base material 4 to detect contact of the two members. Therefore, the descent time counter 26 can measure a period from the de-energization of the lift coil 5 to the press-contact of the stud 2 with the base material 4, namely, the time of descent. Measured times of descent are input to an average value calculator 27 provided in the control device 8. The average value calculator 27 operates to average, for example, ten measured values. Calculator 27 may be arranged to exclude measurement values out of an allowable range previously set. It is preferable to arrange that calculation is made every time the base material is replaced and the order of welding is changed. According to the present invention, outputs from the average value calculator 27, i.e., averaged times of descent, are input to the sequence controller 11, which is given the function to adjust the timing of de-energizing the lift coil 5 by using values averaged by the average value calculator 27.

Thus, based on an average value of descent time from the average value calculator 27, the sequence controller 11 adjusts the timing of de-energizing the lift coil 5. The timing of de-energization after adjustment is fed to the lift coil controller 12, which de-energizes the lift coil 5 so as to keep the welding time unchanged. In this way, a constant welding time is maintained.

According to the present invention, the control device is provided with means to measure descent time from de-energization of the lift means to press-contact of the stud with the base material, means to average such time values measured N times, and means to adjust the timing of de-energizing the lift means by using average values. Therefore, the welding time is reliability kept constant, thereby maintaining the quality of welding a high level.

While the invention has been described in detail herein, it is to be understood that this detailed description if by way of example only, and the protection granted is to be limited only by the spirit of the invention and the scope of the following claim.

I claim:

1. In a stud welding machine comprising a welding gun having a collet to hold a stud at the end thereof, lift means to lift the stud held by the collet from a base material, a power source connected to the welding gun to supply predetermined power across the stud and the base material, and a control device connected to the power source and the welding gun to control the power supplied from the power source to the welding gun to produce a pilot arc and subsequently a main arc across the stud and the base material, said control device comprising means to energize said lift means of the welding gun to lift the stud a predetermined distance from the base material to produce the pilot arc and then the main arc and to de-energize the lift means after a predetermined time to press the stud onto the base material to make the weld, said control device also including detection means to detect the voltage across the stud and the base material and to output a signal indicating that the stud is in press-contact with the base material, said control device including means to stop the supply of power from the power source to the welding gun after receiving said press-contact signal from the detection means, the improvement comprising means in said control device to measure descent time from de-energization of the lift means to contact of the stud with the base material, means to calculate an average value of such times measured N times, and means to adjust the timing of de-energizing of said lift means by using said average value.

* * * * *